Sept. 24, 1968                J. H. LEMELSON                 3,402,982
                         ELECTRO-OPTICAL SYSTEM
                          Filed Sept. 30, 1965

INVENTOR.
Jerome H. Lemelson

United States Patent Office 3,402,982
Patented Sept. 24, 1968

3,402,982
ELECTRO-OPTICAL SYSTEM
Jerome H. Lemelson, 85 Rector St.,
Metuchen, N.J. 08840
Continuation-in-part of applications Ser. No. 170,198,
Jan. 31, 1962, Ser. No. 142,748, Aug. 28, 1961, and
Ser. No. 515,417, June 14, 1955. This application
Sept. 30, 1965, Ser. No. 505,086
28 Claims. (Cl. 352—27)

This invention relates to an improved electro-optical scanning and projection apparatus and is a continuation-in-part of my prior applications Ser. No. 170,198 filed Jan. 31, 1962, Ser. No. 142,748 filed Aug. 28, 1961, and Ser. No. 515,417 filed June 14, 1955, which is now U.S.P. 3,003,109.

The above-mentioned application Ser. No. 515,417 describes a variety of systems for moving a transducer device along a row or bank of cartridges containing reels of recorded information in strip form to a preselected one of the cartridges, then moving the transducer into detection relationship with the selected cartridge, coupling the transducer to the cartridge, and scanning the information strip to detect the recorded information. The present application is directed specifically to a continuous loop, single reel cartridge arrangement and means for driving the information strip for use in systems as described in the parent application.

In the storage and reproduction of picture information, it is the common practice to provide a series of frames of still or motion picture phenomena arranged in the form of a film strip which is power driven between one or two reels and guided in a predetermined path past electro-optical projection or scanning apparatus. A primary shortcoming in the average film transport is that the film must be initially threaded through a plurality of sprocket or drive wheels which is both a time consuming and difficult operation. The act of threading or effecting the guidance of a film strip frequently results in damage or destruction to the film. Even if the film is not torn or otherwise damaged, the frequent handling required during the threading operation will result in scratching the surface of the film and soiling that portion which is handled.

Film cartridges have been proposed in the prior art to eliminate the necessity of handling the film but none have been particularly successful due to various shortcomings. Such cartridges, for the most part, have necessitated partial threading or manipulation of a loop of the film extending from the cartridge, through a plurality of pairs of sprockets and drive means. Other proposed cartridge and scanning arrangements contain optical components, relays and drives as part of each unit, and are relatively expensive, complex, and difficult to adjust and operate. It is accordingly a primary object of this invention to provide an improved apparatus for scanning or projecting images from a film strip as a motion picture or a plurality of still frames.

Another object is to provide an improved electro-optical film scanning and projection apparatus employing a film cartridge in which the film is substantially completely retained within the cartridge and need not be removed therefrom to effect the drive thereof.

Another object is to provide an electro-optical projecting apparatus employing an improved film cartridge and an optical system positionable relative to said cartridge which includes a light source which is moveable directly behind a portion of the film for scanning or projecting the image of the film frames without the need for removing the film from the cartridge and without use of a complex optical system.

Another object is to provide an improved electro-optical scanning and projection arrangement including a film strip mounted within a cartridge and an electro-optical projection or scanning system including a light source moveable to a position directly behind a portion of the film for the projection of light therethrough and a simple drive means not associated with the cartridge but removably coupleable thereto for driving the film.

Still another object is to provide an improved electro-optical scanning arrangement including a cartridge for a film strip which is completely mounted in said cartridge and is completely protected thereby from damage which the conventional film strip may experience during handling or misalignment of the guide and drive means for the film.

Another object is to provide an improved electro-optical device including a closed-loop film cartridge having film therein which is totally enclosed within and protected by the cartridge and which is capable of being continuously driven for the repetitive scanning or projection of the images of the film without the need for rewinding said film.

Another object is to provide an electro-optical scanning or projection arrangement including a film strip and a cartridge therefor and an arrangement of a projection optical system and a drive means for said film which is easily coupled and decoupled relative to the cartridge.

Another object is to provide an improved film cartridge applicable to apparatus for scanning or projecting images from film strip which cartridge is relatively simple in structure and foolproof in operation.

Another object is to provide an improved drive arrangement for a film cartidge.

Another object is to provide an improved projection arrangement for a film cartidge.

Another object is to provide an improved optical scanning arrangement including a film cartridge containing a closed loop film strip with plural frame recordings thereon, and a scanning apparatus which is automatically coupleable to said cartridge and comprises, in addition to decoupleable drive means for the film in said cartridge, a single light source for projecting light through the film retained within said cartridge, without removal of said film therefrom.

Another object is to provide an improved design in a housing or cartridge for containing film strip and the like and in a projection arrangement utilizing same.

With the above and such other objects in view as may hereof more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

Figure 1:
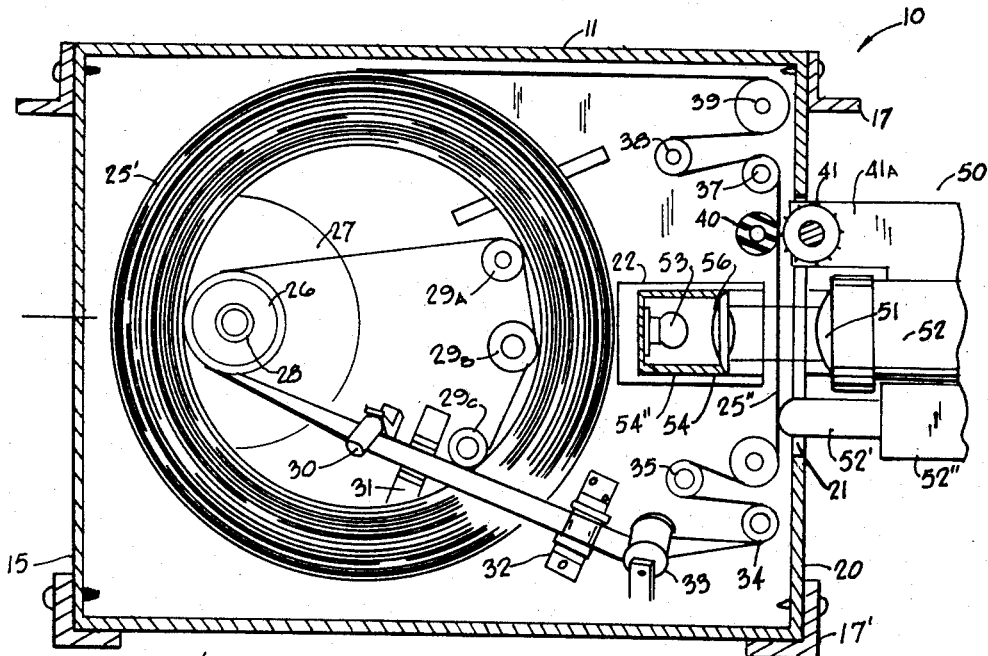
FIG. 1 is a side view, with parts removed and sectioned for clarity of a tape or film cartridge and an optical scanning and drive system coupled thereto.
Figure 2:
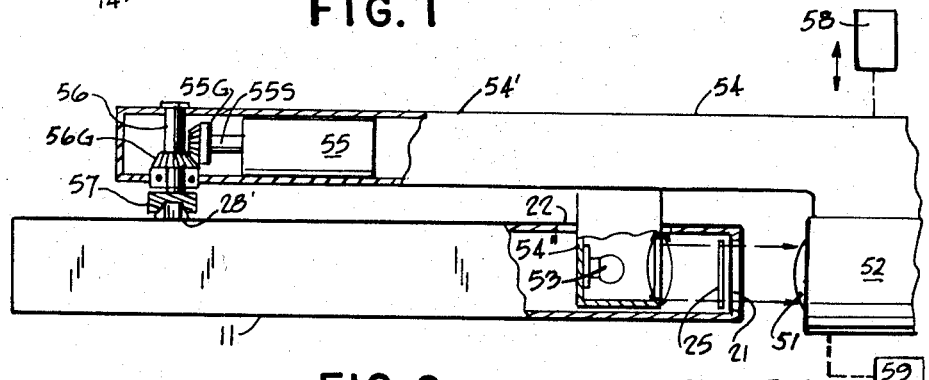
FIG. 2 is a plan view of part of the apparatus shown in FIG. 1 with parts sectioned and removed for clarity.

Referring to the drawings, there is shown in FIGS. 1 and 2 a decoupleable assembly of a tape or film magazine 11 and an electro-optical scanning lens means 51 for receiving light after being modulated in passing through the film contained by the magazine 11. The housing 52 may contain optical and electrical components of a projection system for projecting motion pictures or still images derived from a film strip 25 within the cartridge or housing 11 in a single supply coil 25' which is guided end of a scanning device such as a video camera.

The film containing housing or cartridge 11 comprises a plurality of walls enclosing and guiding an elongated recording member such as a tape or film strip 25 in a closed loop path. The film 25 is stored primarily within housing 11 in a single supply coil 25' which is guided by a plurality of retaining and supporting idlers and projections from the side walls of the housing. Said housing is preferably made of thin sheet material having a top wall 12, bottom wall 14, rear wall 16, front wall 20 and side walls one of which, 15, is illustrated. The housing 11 is supported in position by a plurality of supports including two retainers 17 and 17' at the front of the housing and two 19 and 19' at the rear of the housing which retainers may be part of a frame or further housing adapted for removably supporting one or more of said film containing cartridges 11. The supply coil 25' of film 25 is guided by a plurality of projections 41 and rollers 43 and 44 extending from the side walls of the housing and idlers 29a, 29b, 29c, which bear against the inside of the coil 25' and guide it in rotation in cooperation with a power driven wheel 26 positioned across the coil from the idlers. Wheel 26 is affixed to a circular disc or plate 27 having a flat face engaging the portion of the coil 25' extending thereover which disc rotates with 26 and urges the film coil 25' to rotate counterclockwise. The idlers 29a, 29b, and 29c cooperate with the wheel 26 and a plurality of other idlers and guide means referred to by the notations 30 to 39 in removing tape of film strip 25 from the inside of the coil and guiding it in a fixed path through the housing and onto the the outside of the coil as illustrated. Said path includes a portion 25" of the film extending substantially parallel to the front wall 20 of the housing 11 past an opening 21 therein, through which opening scanning and driving of the film may be effected.

In a preferred form of the invention an opening 22 is provided in the side wall 15 of the housing directly behind that portion 25" of the film 25 which is aligned with the lens 51 of the electro-optical scanning apparatus 52. Through said opening, a light source or means for guiding a beam of light may be inserted to pass light directly through that portion of the film 25 aligned with the light receiving device 52. Illustrated in FIGS. 1 and 2 as supported by the housing 50 for the optical system 52, is a further support 54 for a light source 53 which is mounted in a sub-housing 54" which projects laterally from support 54. The light source 53 is movable to a position directly behind the film passing opening 21 by movement of the sub-housing 54" through the opening 22 in the side wall of the cartridge 11 upon coupling of the said cartridge and the assembly 50. Coupling may be effected by the controlling or guided movement of the assembly 50 relative to a fixed cartridge or movement of the cartridge relative to 50 in a manner to effect the prepositioning of the optical system housing 52 in front of the opening 21 in the end wall 20 and the retainer or sub-housing 54" adjacent the opening 22 in the side wall 15 with the end, light containing portion thereof inserted into the cartridge. A servo motor driven means, noted at 58, shown generically, may be utilized to effect the controlled movement of the mount 54 along a predetermined path, as shown by the arrow, to preposition the sub-housing 54" and the light source 53 retained thereby so that light may be directed through the film by means of a lens 56 supported in front of said light source 53 and through the lens 51 comprising a portion of the projection or receiving apparatus 52. It is also noted that a prism and/or mirror system may be utilized to direct light from a light source situated within housing 54 through the sub-housing 54" and that portion of the film 25 aligned with the aperture or lens 56 in the sub-housing.

Also illustrated in FIGS. 1 and 2 is a film drive means provided in part by means of a drive wheel 41 which is rotationally supported on the base or assembly 50 and driven through gears (not shown) by a motor 55. The drive wheel 41 engages the exposed outer surface of film 25 and effects driving thereof when rotated in cooperation with a bucking member or support 40 positioned behind the film and secured to the side walls of the housing 11. The support 40 may comprise a stationary device or free wheeling depressor wheel or idler. Wheel 41 may also contain sprocket means adapted to engage the conventional border situated holes or slots provided along the length of most film strips. For the projection of motion pictures, the use of a sprocket wheel engaging the slots in the film to drive said film may also be employed to synchronize the operation of the conventional shutter, not illustrated, but comprising part of the projection mechanism provided in housing 52.

The film scanning assembly 50 and cartridge 11 of FIGS. 1 and 2 are adapted for rapid coupling and decoupling of one from the other so that the film strip of a plurality of such cartridges may be scanned or searched for projection onto a screen or remote viewing without difficulty. Accordingly, means are provided for manually or automatically moving one of said assemblies relative to the other to effect the described coupling action and for removing or decoupling said assemblies from the vicinity of each other. Notation 59 refers to a servo motor adapted for moving assembly 50 along a predetermined path towards and away from the end wall 20, as indicated by the arrow, and notation 58 to a servo motor operatively coupled to assembly 50 for moving it along a predetermined path normal to the side wall 15, as indicated by the arrow, so that sub-housing 54" containing the projection light source may be inserted thereby through the opening 22 in said side wall. Although not considered part of this invention, the motors 58 and 59 may be synchronized in their operation so that when the assembly 50 is brought into substantial alignment with the cartridge 11, sub-housing 54" will be advanced parallel to the side wall 15 until aligned with an edge opening or window 22 whereupon motor 59 is automatically stopped and motor 58 operated to advance the end of housing 54 through opening 22. Decoupling of the assembly is effected by sequentially operating said servos in the reverse order.

In a preferred form of the invention, the projection assembly also contains drive means for shaft 28 which effects rotation of film coil 25' and feed of said film strip therefrom. It is thus not necessary to provide a driving means or servo as part of each cartridge. Extending longitudinally from housing 54 is an arm supporting a constant speed electric motor 55. A gear 55G is secured to the end of the shaft 55S of motor 55 and operatively engages a second bevel gear 56G mounted on a second shaft 56 which is supported in bearing at the end of arm 54' and rotates about an axis which is normal to the axis of shaft 55S and parallel to the axis of shaft 28. Projecting outward from wall of housing 11 is an extension of shaft 28 having a bevelled fitting 28' mounted thereon. Secured to the outwardly projecting end of shaft 56 is a female fitting 57 adapted to be frictionally retained against the bevelled, serrated surface of 28' when 57 is aligned therewith and assembly or mount 50 is moved by motor 58 in the act of inserting the end of housing 54 into the opening 22 in side wall 15. In other words, shaft 56 is so positioned that its coupling member 57 will engage 28' in such a manner upon insertion of 55 into the cartridge opening that motor 55 will be coupled to drive shaft 28. Thus upon the operative coupling of assembly 50 and the cartridge, the film is driven in a closed loop path by the cooperative engagement of drive wheel 41 against a portion of the film adjacent the scanning field and the operation of the drive means for shaft 28. It is noted that a single servo such as motor 55 may be employed to drive both the sprocket or frictional drive wheel 41 and shaft 28 by means of the proper gear trains.

Also illustrated in FIG. 1 is a mount 52" for a transducer 52' secured to the assembly 50 for positioning 52' in alignment with a portion of the section 25" of film or tape 25 aligned with opening 21. If member 25 is film, it may be coated along one border with a magnetic oxide or the like for magnetically recording frame information pulse signals or sound signals adjacent the image frames. Transducer 52' is thus positionable, upon movement of sub-housing 54" through opening 22, against the magnetic recording band area of the film 25 for reproducing therefrom and/or recording thereon. The cartridge 11 and transducing-driving apparatus 50 may thus be employed for a plurality of functions including the projection of motion pictures with accompanying sound, the selective reproduction of still images as identified by adjacent magnetic signals, the magnetic recording of changeable information such as codes, sound or the like relative to a motion picture recording or plurality of still information images and the updating or changing of said changeable information as changes occur therein and the recording and erasure of information signals for identifying all or part of the information relative to a particular frame or frames of images or for updating or changing said information. In other words, notation 52' is representative of a transducing means capable of performing one or all of the functions of recording, erasing or reproducing information or sound signals recorded on the magnetic recording portion of the band area of 25. In the event that sound or bit information is recorded on a band area near the border of the film per se, the transducer 52' may comprise an optical scanner such as a photoelectric cell and optical system adapted for scanning said film border area.

Figure 3:
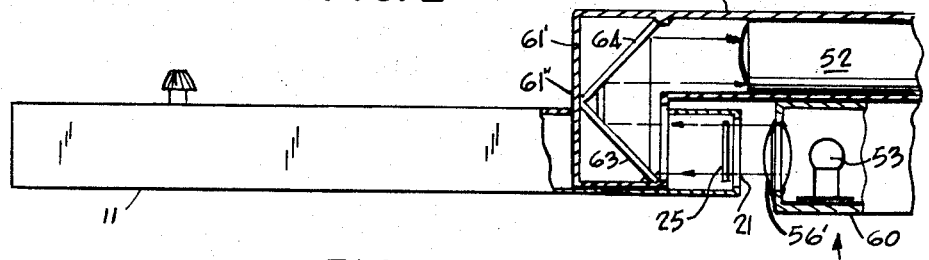
FIG. 3 is a plan view of a modified form of a projection apparatus including a film cartridge and projection means coupled thereto.

FIG. 3 illustrates portions of the apparatus shown in FIGS. 1 and 2 in which the projection system has been modified. Instead of positioning a light source directly behind the film as provided in FIGS. 1 and 2, in FIG. 3 the modified apparatus includes means for positioning in front of the cartridge a light source 53 and lens 56' therefor which are mounted at the end of a housing 60 subtending from the base 50' of the scanning or projection apparatus. At the same time that housing 60 is positioned to provide a light passing through that portion of the film 25 exposed to the opening 21 in the end wall 20 of the cartridge housing 11', a mount 61, which is secured to the base assembly 50' and which houses a projection or scanning apparatus 52, is moved to position a sub-housing 61" through the opening 22 in the side wall 15 of the cartridge. Situated within 61" is a first mirror 63 which reflects the film modulated light generated by 53 to a second mirror 64 situated at the other end of the sub-housing 61". The second mirror 64 then reflects the image modulated light through the hollow forward portion 61' of mount 61 and to the receiving end of the optical system 52.

The second mirror 64 may be eliminated if the optical system 52 is mounted facing the first mirror as in a housing 61a shown in broken line notation and extending aligned with sub-housnig 61".

While the invention has been described in specific embodiments thereof, it is not desired that it be limited thereto for obvious modifications that will occur to those skilled in the art without departing from the spirit and scope of the invention as set forth in the appended claims.

What is claimed is:

1. Apparatus for imaging frames from a film strip comprising:
   (a) a film cartridge for containing an endless motion picture film portion defined by a spiral coil formation thereof having an interior and exterior thereof,
   (b) rotor means for taking such film off the interior of the spiral coil formation and for feeding it onto the exterior thereof,
   (c) an end wall in the cartridge having a single opening therein,
   (d) means for guiding a portion of the film past the opening,
   (e) an optical projection means for directing a source of light through said film, said projection means mounted on a support, and
   (f) means for moving the support along a predetermined path toward and away from said cartridge so as to position the optical projection means directly behind the film in alignment with the opening in the end wall of the cartridge for projecting light through the film and the opening in the end wall.

2. The apparatus as set forth in claim 1 including servo means coupled to the support for the optical projection means for moving the support in said predetermined path.

3. The apparatus as set forth in claim 1 including optical receiving means in alignment with the opening in the end wall of the cartridge for receiving the light from the optical projection means which passes through the film and opening.

4. The apparatus as set forth in claim 3 wherein the optical receiving means comprises an optical projection means for projecting the light received as motion picture images.

5. The apparatus as set forth in claim 3 wherein the optical receiving means comprises the receiving portion of a television camera.

6. In combination with a device for viewing images on film strip containing spaced perforations for advancing said film strip and stored as an endless loop in a film magazine having an opening in one end thereof, said magazine having means for guiding said film strip past said opening, the improvement which comprises a drive means for moving said film strip, said drive means being separate from said magazine and including toothed means for engaging said perforations in said film strip through said opening in said magazine, means attached to said magazine and disposed behind the portion of said film strip extending across said edge opening serving to support said film strip, means for guiding said drive means for said film strip into alignment with said magazine whereby the teeth of said toothed means engage the perforations in said film strip and said toothed means urges said film strip against said supporting means therefor, whereby, upon operation of said toothed means, said film strip will be driven past said opening.

7. The combination of claim 6 wherein the film strip is stored as an endless loop in said magazine and said drive means includes a toothed wheel having teeth radially projecting from said wheel to engage in respective perforations in said film strip as the wheel is rotated.

8. An electro-optical apparatus for scanning image frames on film strip comprising in combination with an optical scanning system including a light source, a flexible film strip having image frames sequentially arranged along a length of said strip, a cartridge including a housing having means for guiding said film strip in a predetermined path with said film strip being totally retained within said housing, a wall of said housing defining a window, said predetermined path including a portion of said film strip disposed adjacent said wall and said window, drive means for said film strip mounted adjacent said scanning system and situated exterior of said cartridge, said drive means being removably coupleable to said cartridge for moving said film strip in said predetermined path, said light source being disposed adjacent said window, upon coupling, with said drive means, defining a projection path for light from said light source which path includes said window and said film strip, further components of said optical system including light reflection and projection means, a mount for said further components of said optical system, said mount being movable into position behind said portion of film strip disposed adjacent said window to receive light from said light source after passing through said window and film strip and adapted to project said light away from said housing along a path at an angle to the original path through said film.

9. An electro-optical apparatus for scanning image frames on film strip comprising in combination with an optical scanning system including a light source, a film strip provided as a closed loop formation of motion picture film, a cartridge including a housing for said film strip, means for guiding said film strip in a predetermined path through said housing, an end wall of said cartridge disposed adjacent a free length of said guided film strip, said cartridge defining a projection path for light from said light source which includes projection through a portion of said free length of film strip and said end wall, a mount for said cartridge, drive means for said film strip situated exterior of said cartridge, said drive means being coupleable and decoupleable from said cartridge for effecting the movement of said film strip through said housing, a servo means connected to said drive means, said film strip being wound into a coil formation of film, a portion of said film winding off said coil formation and guided in a path away from said coil formation adjacent said end wall and then back to said coil formation, and for projecting light from said light source to move said cartridge and into position between said coil formation and said free length of strip for projecting light along said projection path.

10. Apparatus in accordance with claim 9 including a servo means operatively coupled to said optical scanning system and operative to urge movement of said means for projecting light from said light source to said position directly behind said film strip.

11. An electro-optical apparatus comprising in combination with an optical scanning system, a closed loop film strip having image frames sequentially arranged along the length of said film strip, a cartridge including a housing for retaining said film strip, guide means within said housing for guiding said film strip in a closed loop path through said housing, said film strip being wound into a coil formation of film, an end wall of said housing disposed away from said coil formation, a portion of said film strip winding off said coil formation said film strip extending away from said coil formation and running adjacent to said end wall, and then back onto the exterior of said coil formation, a window in said end wall aligned with a portion of the adjacent film strip, said optical system being disposed adjacent said window, a light source, light directing means movable between said coil formation and that portion of the film strip extending adjacent said end wall for directing light from said light source through said film strip and said window in said end wall to said optical system.

12. Apparatus in accordance with claim 11 including a support for said light directing means, servo means operatively coupled to said support, said optical scanning system and said cartridge being movable relative to each other and positionable whereby said light directing means support is positioned at the side of said cartridge behind said end wall and aligned with the window therein, guide means for guiding said support in a path directly behind said film strap, said servo means being operative, upon alignment of said support and said cartridge, to move said support whereby said light directing means is positioned directly behind said film strip.

13. Apparatus in accordance with claim 12 including drive means for said film strip fixedly mounted relative to said support and movable to engage a portion of said film strip exposed through the opening in said end wall of said housing upon alignment of said housing and said support, servo means coupled to said drive means and operative after engagement of the drive means with said film strip to cause the movement of said film strip past said opening and in said guided closed loop path.

14. Apparatus in accordance with claim 13 including movable means situated within said cartridge housing for urging rotation of said coil portion of said film strip, said drive means also being coupleable to said movable means upon alignment of said support with said housing, to effect rotation of said movable means in cooperation with the driven movement of that portion of the film strip past the window in said end wall.

15. An apparatus for scanning image frames on film strip comprising in combination with an optical scanning system including a light source, a film strip having image frames sequentially arranged along a length of said strip, a cartridge including a housing for said film strip, means for guiding said film strip in a predetermined path through said housing, an end wall for said cartridge disposed adjacent to a length of the guided film strip, a window in said end wall for exposing a portion of the length of said film strip to the exterior of said cartridge, drive means for said film strip situated exterior of said cartridge and coupleable thereto for moving said film strip past said opening, a support for said cartridge, means operating said drive means to effect the movement of said film strip through said cartridge and past said window and optical system, means for moving said optical system relative to said support, to a position directly behind said film strip from the exterior of said cartridge for directing light from said light source normal to said film strip and said window, upon coupling of said drive means, to said cartridge for illuminating that portion of the film strip in alignment with the window therein for scanning the film strip.

16. Apparatus in accordance with claim 15, including power means for moving said optical system behind said film strip in alignment with the opening in the end wall in said cartridge or optically scanning the film strip.

17. Apparatus in accordance with claim 15, including an optical device adapted for receiving light from said light source and for directing said light along a path other than that along which it is received, means for moving said optical device in alignment with said film strip adjacent said end wall of said cartridge and the window therein, said optical device being disposed when adjacent the window of said cartridge to direct light from said light source through said film strip and through said window in said cartridge.

18. Apparatus in accordance with claim 15, said film strip being disposed within said cartridge in a closed loop and adapted for continuous movement past said window in said cartridge end wall whereby the images on said film strip may be continuously scanned without rewinding the film strip.

19. Apparatus in accordance with claim 15 including a guide means disposed directly behind said film strip in alignment with the window provided in the end wall thereof, the drive means for said film strip including power operative means coupleable to the film strip through said window in the end wall thereof and means moving said drive means to engage said film strip against the guide means positioned behind said window to urge movement of said film strip past said window.

20. Apparatus in accordance with claim 15, said film strip having a sound track recorded adjacent said frame recordings, and a transducing means, means for relatively positioning said transducing means and said sound track to permit scanning the latter by said transducing means upon the movement of said film strip, and a loud speaker operatively connected to said transducing means for generating sound in accordance with the signals transduced by said transducing means.

21. Apparatus in accordance with claim 20 in which said sound track is a recording provided in a magnetic recording material provided as a band adjacent said frame recordings, and said transducing means is a magnetic reproduction transducer, means positioning said transducer through said opening in said end wall of said cartridge upon alignment of said scanning system with said cartridge and whereby said transducer engages said sound track portion of said film strip.

22. Apparatus in accordance with claim 21 including a common base member on which said optical scanning system and said transducer are mounted.

23. The apparatus as set forth in claim 1, wherein the motion picture film contains motion picture and audio information recorded along its length, and the apparatus includes receiving means for the light passed through the film from the projection means, said receiving means includes pick-up means for light modulated by both said motion picture and audio information recorded on said film strip, said pick-up means being operative to transduce the modulated light energy received thereby to variable electrical signals indicative of said recorded picture and audio information.

24. An electro-optical apparatus for scanning image and audio information recorded on a filmstrip comprising in combination: an optical scanning means including a light source, a record member provided as a closed loop formation of flexible filmstrip having motion picture and audio information recorded along its length, a magazine including means for guiding said filmstrip in a predetermined path within said magazine, means for scanning said audio recordings on said filmstrip, a mount having means for retaining and predeterminately locating said magazine with respect to said optical scanning means and said means for scanning said audio recordings, drive means for said film strip situated exterior of said magazine, means for coupling said drive means for driving said filmstrip through said magazine when said magazine is predeterminately located on said mount, said filmstrip being wound into a coil formation within said magazine and extending from said coil as a free length of film through the scanning field of said optical scanning means and past said audio scanning means and then back onto said coil formation, means for directing light from said light source against a portion of said free length of said filmstrip, means for operating said drive means to drive said free length of filmstrip through the field of said optical scanning means and past said audio scanning means and then back onto said coil formation, whereby light from said light source is modulated by the motion picture recordings on said filmstrip and said audio recordings on said filmstrip.

25. The apparatus as set forth in claim 24, wherein the audio scanning means includes a photoelectric cell.

26. The apparatus in accordance with claim 24, wherein the audio information comprises a magnetic recording on said filmstrip, the means for scanning said audio recording comprises a magnetic pick-up operative by said magnetic recording on said filmstrip.

27. An electro-optical apparatus for scanning image and audio information recorded on a filmstrip comprising: an electro-optical scanning means including a source of radiation to be modulated, a record member provided as a closed loop formation of flexible filmstrip having motion picture and audio information recorded along its length, a magazine including means for supporting and guiding said filmstrip in a predetermined path, a mount for predeterminately locating said magazine with respect to said optical scanning means, drive means for said filmstrip situated exterior of said magazine, said drive means being coupleable and decoupleable with respect to said magazine, upon relative movement of said magazine and drive means and operative when coupled to said magazine for effecting movement of said filmstrip through said magazine, power means connected to operate said drive means, said filmstrip being wound in a coil formation within said magazine and extending as a free length of film through the scanning field of said scanning means and then back onto said coil formation for continuously scanning said filmstrip, said scanning means being situated to scan a portion of said free length of filmstrip as it is driven through the scanning field and said scanning means including video and audio signal transducing means for receiving the radiation modulated by the recordings on said filmstrip and converting said modulated energy to corresponding video and audio electrical signals.

28. An apparatus for scanning image information recorded on a film strip comprising: an optical scanning system having a source of light adapted to be modulated and including video and audio signal transducing means, a record member provided as a length of flexible film strip having motion picture and audio information recorded along its length, a magazine including means for supporting and guiding said film strip, a mount for predeterminately locating said magazine with respect to said optical scanning system, drive means for said film strip situated exterior of said magazine, means for operatively coupling said drive means to drive said film strip through said magazine upon mounting of said magazine in alignment with respect to said optical scanning system, power means connected to said drive means to operate said film strip drive means, said film strip being wound in said magazine and extending as a free length of film through the scanning field of said optical scanning system for continuously scanning said video and audio information recorded on said film strip, means for directing light from said light source through said free length of said film strip, light reflecting means disposed directly behind said film strip when the operative assembly of said magazine, said mount and said optical scanning system is accomplished and adapted to receive the modulated light directed from said light source through said film strip and to re-direct said modulate light along a path angularly positioned with respect to the path of said light through said film strip and said video and audio signal transducing means being disposed to receive said re-directed light from said light reflecting means.

References Cited

UNITED STATES PATENTS

| | | | |
|---|---|---|---|
| 1,968,979 | 8/1934 | Adams | 352—131 X |
| 2,624,231 | 1/1953 | Kingston | 352—83 |
| 2,625,073 | 1/1953 | Young et al. | 352—123 |
| 2,630,485 | 3/1953 | Heikes et al. | 352—131 X |
| 3,139,789 | 7/1964 | Schrader | 352—72 |
| 3,212,837 | 10/1965 | Beyer | 352—72 |
| 3,227,508 | 1/1966 | Bavaro | 352—27 |
| 2,279,022 | 4/1942 | Duskes | 352—128 |

JULIA E. COINER, *Primary Examiner.*